(12) United States Patent  (10) Patent No.: US 8,149,462 B2
Kakutani                     (45) Date of Patent:    Apr. 3, 2012

(54) LINE PRINTER

(75) Inventor: Toshiaki Kakutani, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 655 days.

(21) Appl. No.: 12/170,315

(22) Filed: Jul. 9, 2008

(65) Prior Publication Data

US 2009/0015871 A1  Jan. 15, 2009

(30) Foreign Application Priority Data

Jul. 11, 2007 (JP) ................................. 2007-182323

(51) Int. Cl.
H04N 1/405 (2006.01)
B41J 29/38 (2006.01)
G06K 15/00 (2006.01)
B41J 2/205 (2006.01)

(52) U.S. Cl. ........... 358/3.06; 358/3.13; 347/14; 347/15
(58) Field of Classification Search .................. 358/1.9, 358/3.06, 3.13; 347/5, 14, 15, 19, 40, 41, 347/43

See application file for complete search history.

(56) References Cited

U.S. PATENT DOCUMENTS

2002/0186417 A1* 12/2002 Inoue ........................... 358/3.14
2006/0279789 A1* 12/2006 Yamazaki et al. ........... 358/3.13
2007/0008370 A1* 1/2007 Kawatoko et al. ............. 347/19

FOREIGN PATENT DOCUMENTS

| JP | 2001-071495 | 3/2001 |
| JP | 2004501012 T | 1/2004 |
| JP | 2007-015359 | 1/2007 |
| WO | 0202339 A1 | 1/2002 |

* cited by examiner

Primary Examiner — James A Thompson
(74) Attorney, Agent, or Firm — DLA Piper LLP (US)

(57) ABSTRACT

A plurality of types of positional shift postulated patterns are postulated wherein the positional shift of print head tips in a printer are postulated to have positional shift directions and distances. For each of the postulated positional shift postulated patterns, a base dithering mask is generated considering the ability to produce excellent dot dispersion characteristics when this postulated positional shift has occurred. Additionally, optimal dithering masks are generated through multiply combining the sets of threshold values that comprise the base dithering masks. Doing so enables the suppression of degradation of printed image quality, even when there are positional shifts between the print heads, in a half toning process for printing using a printer that is provided with a plurality of print heads that are arranged in a line across a printing range.

4 Claims, 12 Drawing Sheets

Fig.5

| POSITIONAL SHIFT POSTULATED PATTERN | POSITIONAL SHIFT OF PRINT HEAD TIPS | PRINTED IMAGE DOT LAYOUT |
|---|---|---|
| PATTERN 0 | NO SHIFT — HT1, HT2 | |
| PATTERN 1 | ONE PIXEL UP — HT1, HT2 | 1pxl |
| PATTERN 2 | ONE PIXEL DOWN — HT1, HT2 | 1pxl |
| PATTERN 3 | ONE PIXEL RIGHT — HT1, HT2 | 1pxl |
| PATTERN 4 | ONE PIXEL LEFT — HT1, HT2 | 1pxl |

Fig.9

| POSITIONAL SHIFT POSTULATED PATTERN | AMOUNT OF SHIFT | BASE DITHERING MASK |
|---|---|---|
| PATTERN 0 | NO SHIFT | BDl0 BDr0 BDl0 BDr0 — BD0 |
| PATTERN 1 | ONE PIXEL UP | BDl1 BDr1 BDl1 BDr1 — BD1, 1pxl |
| PATTERN 2 | ONE PIXEL DOWN | BDl2 BDr2 BDl2 BDr2, 1pxl — BD2 |
| PATTERN 3 | ONE PIXEL RIGHT | BDl3 BDr3 BDl3 BDr3 — BD3, 1pxl |
| PATTERN 4 | ONE PIXEL LEFT | BDl4 BDr4 BDl4 BDr4 — BD4, 1pxl |

ARRANGEMENT OF PRINT HEAD TIPS

POSITIONAL SHIFT PATTERNS

APPLICABLE DITHERING MASKS

Fig.12
| POSITIONAL SHIFT POSTULATED PATTERN | AMOUNT OF SHIFT | BASE DITHERING MASK |
|---|---|---|
| PATTERN 0 | NO SHIFT | 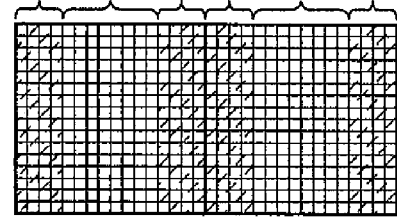 BDl0 BDm0 BDr0 BDl0 BDm0 BDr0 — BD0 |
| PATTERN 1 | ONE PIXEL UP | 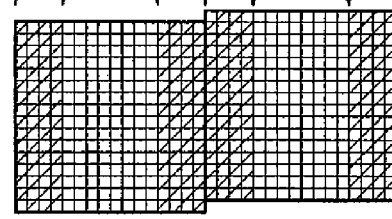 BDl1 BDm0 BDr1 BDl1 BDm0 BDr1 — BD1, 1pxl |
| PATTERN 2 | ONE PIXEL DOWN | 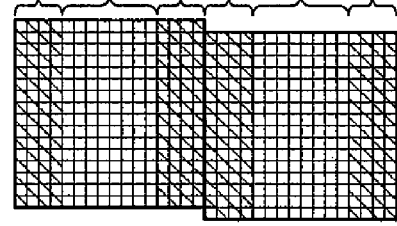 BDl2 BDm0 BDr2 BDl2 BDm0 BDr2 — BD2, 1pxl |
| PATTERN 3 | ONE PIXEL RIGHT | 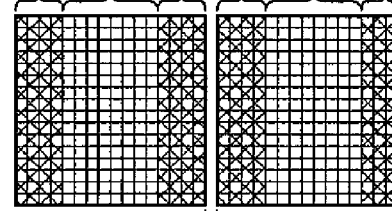 BDl3 BDm0 BDr3 BDl3 BDm0 BDr3 — BD3, 1pxl |
| PATTERN 4 | ONE PIXEL LEFT | 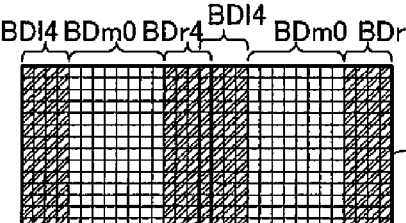 BDl4 BDm0 BDr4 BDl4 BDm0 BDr4 — BD4, 1pxl |

ARRANGEMENT OF PRINT HEAD TIPS

POSITIONAL SHIFT PATTERNS

APPLICABLE DITHERING MASKS

LINE PRINTER

CLAIM OF PRIORITY

The present application claims priority from Japanese application P2007-182323A filed on Jul. 11, 2007, the content of which is hereby incorporated by reference into this application.

BACKGROUND

1. Field of the Invention

The present invention relates to a line printer that is provided with a plurality of printing heads, disposed across a printing range.

2. Description of the Related Art

In inkjet-type line printers, ink droplets are sprayed from nozzles of print heads that are disposed in essentially a single line in a direction that is perpendicular to the direction of feeding of printer paper as the printer paper is being fed, to adhere to the printer to print text and graphics.

In line printers, in a thermal printer, for example, typically a printer head is formed with a plurality of print heads disposed in a line. The use of a plurality of print heads in this way is to improve the yields of the printer heads that are manufactured by being cut out of disk-shaped silicon substrates. A line printer that is structured in this way is a known technology described in, for example, Japanese Unexamined Patent Application Publication 2001-71495.

In a line printer that is structured by disposing a plurality of print heads in a line, as described above, the diameter of a single dot is extremely small when printing with high image quality. For example, when printing at 600 dpi, the diameter of a single dot is about 40 µm. Given this, a shift of the placement position of the print head from the proper position, even if minute, will cause a degradation in the printing quality. Securing this type of extremely high precision positioning, is extremely difficult in practice, and thus a degradation of printing quality due to positional shift of the print head is a problem inherent to this type of line printer.

SUMMARY

Given the problem described above, the problem to be solved by the present invention is that of performing printing using a dithering mask capable of suppressing degradation of printing quality even when there is positional shift between the print heads in a printer that is provided with a plurality of print heads disposed in a line across the range of printing. An additional object of the present invention is to characterize a preferred dithering mask used in this type of line printer.

The present invention was created in order to solve, at least in part, the problem described above, and can be embodied in the forms or preferred embodiments described below.

A first type of a line printer comprises:

a plurality of print heads disposed in a line across the printing range;

half toning unit that performs a half toning process, using a dithering mask, on image data; and printing controlling unit that drives said print heads using results of the half toning process to form an image, wherein:

said dithering mask has a pattern generated by:

postulating a plurality of types of positional shift patterns that exhibit shifted states and non-shifted states in specific directions and distances between said plurality of print heads;

generating individual base dithering masks considering dot dispersion characteristics that occur in positional shift patterns, for each of the plurality of types of positional shift patterns; and combining a plurality of sets of threshold values that structure portions of respective base dithering masks that have been generated.

In a line printer of this structure, the dithering mask is produced through combining sets of threshold values that structure portions of base dithering masks, taking into consideration the dispersion characteristics of dots in each postulated positional shift pattern. Consequently, even if there are positional shifts between the plurality of print heads, it is possible to suppress degradation of the printing quality through ensuring the dispersion characteristics of the print dots by performing the half toning process using a dithering mask that is assembled corresponding to the positional shifts.

In this type of line printer:

the individual base dithering masks comprise a set of shared threshold values that are used in common between each of the base dithering masks, and a set of individual threshold values that are used individually in respective base dithering masks; and:

the dithering mask is produced through combining the set of shared threshold values and the set of individual threshold values.

In this type of line printer, the dithering mask is produced as a structure that has a base dithering mask and a set of shared threshold values, where the range of threshold values that take the dot dispersion characteristics into account is reduced by the amount of the set of shared threshold values, enabling the generation thereof by a small amount of calculations in order to calculate the threshold values that take the dot dispersion characteristics into consideration.

In this type of line printer;

the set of shared threshold values may be a set of threshold values that structures a portion of a base dithering mask that takes dot dispersion characteristics into account relative to a positional shift pattern that exhibits a non-shifted state between the plurality of print heads.

In a line printer structured in this way, the dithering mask is formed using a portion of a base dithering mask, which takes into account the dot dispersion characteristics, as a set of shared threshold values relative to a positional shift pattern that exhibits a non-shifted state between the plurality of print heads, and if the half toning process is performed so as to apply the set of shared threshold values to the pixels that are not affected by positional shift between the printer heads, then it is possible to maintain excellent dot dispersion characteristics even in a printing region corresponding to the set of shared threshold values.

A second type of a line printer comprises:

a plurality of print heads disposed in a line across the printing range;

half toning unit performs a half toning process, using a dithering mask, on image data; and printing controlling unit drives said print heads using results of the half toning process to form an image, wherein:

said dithering mask is generated by:

postulating a plurality of types of positional shift patterns that exhibit shifted states or non-shifted states in specific directions and distances between said plurality of print heads;

generating a composite dithering mask that is composited by combining a set of shared threshold values that are used in common between the respective base dithering masks and a set of individual threshold values that are used individually in the respective base dithering masks, along with structuring a portion of the respective base dithering masks that are generated taking into account the dot dispersion characteristics when a positional shift pattern is produced for each of a plurality of types of positional shift patterns; and correcting the set of shared threshold values by taking into account the dot dispersion characteristics of pixels corresponding to the set of shared threshold values that structure the composite dithering mask.

Because, in the line printer of this structure, the dithering mask is produced by correcting the set of shared threshold values in consideration of the dot dispersion characteristics of the pixels corresponding to the set of shared threshold values, of the composite dithering mask that is composited by combining a set of shared threshold values and a set of individual threshold values, it is possible to perform the printing using a dithering mask with an even higher level of dot dispersion characteristics as a whole.

Note that the present invention can also be structured as a dithering mask, in addition to being structured as the line printers described above. This dithering mask has the characteristic of superior dot dispersion characteristics, obtained through the application of an appropriate dithering mask when there is positional shift in a specific direction, so as to be superior to the dot dispersion characteristics that is obtained through the application of the applicable to their mask when there is no positional shift between the plurality of print heads.

BRIEF DESCRIPTION OF THE DRAWINGS

FIG. 5 is an explanatory diagram illustrating an example of an postulated print head tip positional shift pattern;

FIG. 9 is an explanatory diagram of a one example of a dithering mask pattern table 52;

FIG. 12 is an explanatory diagram illustrating one example of a dithering mask pattern table 52 as a first modification.

DESCRIPTION OF THE PREFERRED EMBODIMENTS

A. Embodiment

A-1. Schematic Structure of the Printer

Figure 1:
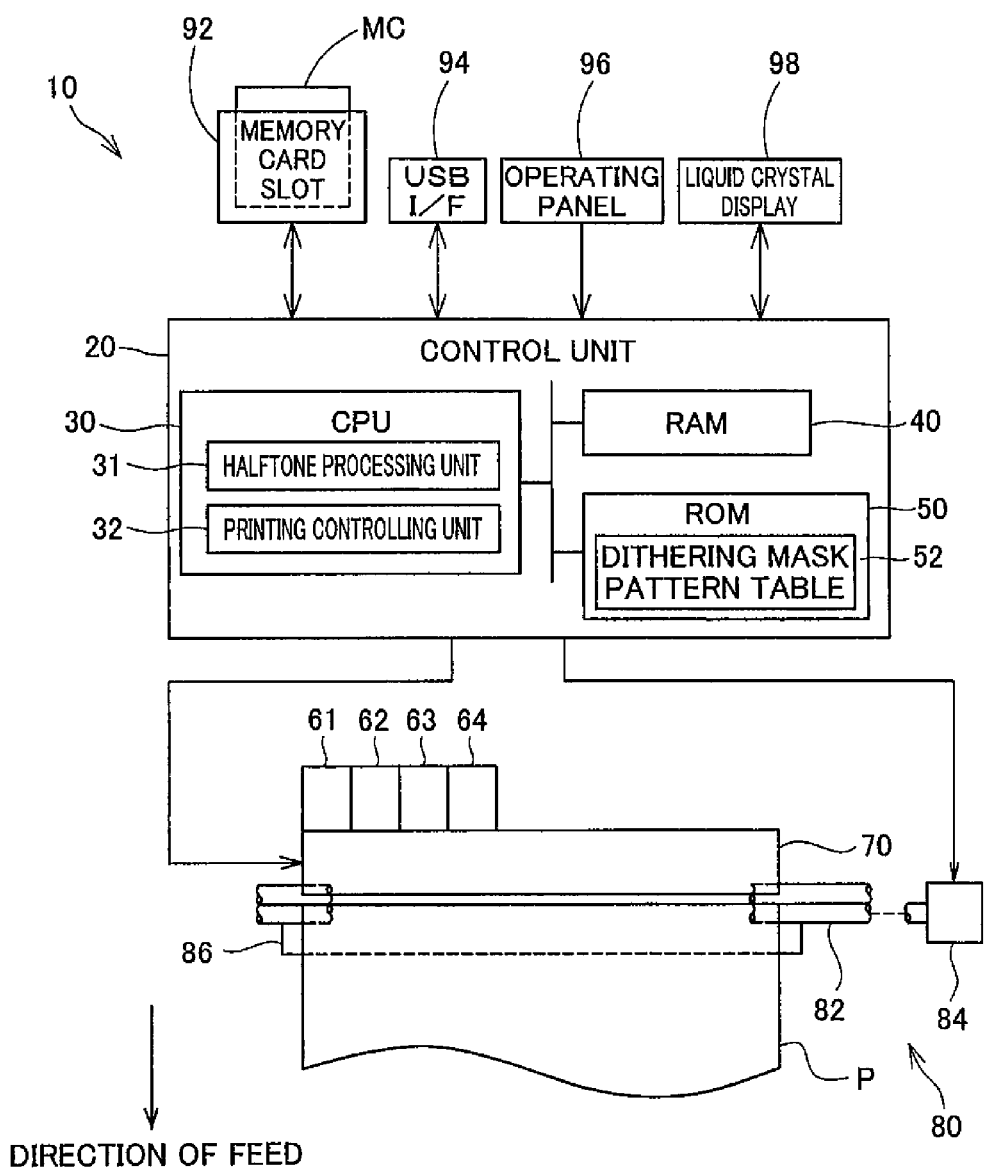
FIG. 1 is an explanatory diagram illustrating the schematic structure of a printer 10 as an embodiment according to the present application.

FIG. 1 is an explanatory diagram illustrating a schematic structure of a printer 10 as an embodiment of the present application. The printer 10 is an inkjet-type line printer, and, as shown in the figure, comprises a control unit 20, ink cartridges 61 through 64, a printer head 70, a paper feeding mechanism 80, and the like. The ink cartridges 61 through 64 correspond to the respective inks that produce the colors of cyan (C), magenta (M), yellow (Y), and black (K). Of course, the types and numbers of inks are not limited thereto.

The printer head 70 is a line head-type printer head, and is provided with a plurality of thermal-type nozzles disposed in essentially a line on the bottom surface thereof. Each of the inks in the ink cartridges 61 through 64 is provided to a nozzle that is positioned on the bottom surface of the printer head 70 through an introduction tube, not shown, and ink is sprayed from these nozzles to perform the printing on printer paper P. the details of the printer head 70 will be explained below using FIG. 2.

The paper feeding mechanism 80 is provided with a paper feeding roller 82, a paper feeding motor 84, and a platen 86. The paper feeding motor 84 rotates the paper feeding roller 82 to convey the printer paper P, which is disposed between the printer head 70 and the plate-shaped platen 86, in a direction that is perpendicular to the axial direction of the paper feeding roller 82.

The control unit 20 is structured from a CPU 30, a RAM 40, and a ROM 50, and controls the operation of the aforementioned printer head 70, the paper feeding motor 84, and the like. The CPU 30 deploys to the RAM 40 a control program that is stored in the ROM 50, and executes said control program to operate as a half toning processing unit 31 and a printing controlling unit 32. The functions of these functioning units will be described in detail below. A control program for controlling the operation of the printer 10 is stored in the ROM 50, and a dithering mask pattern table 52, which is used in the half toning process described below, is also stored in the ROM 50.

Additionally, a memory card slot 92 into which a memory card MC on which is recorded image data D is inserted, a USB interface 94 for connecting devices such as a digital camera, an operating panel 96 for performing a variety of operations relating to printing, and the liquid crystal display 98 for displaying a user interface (UI) are connected to the control unit 20.

A-2. Detailed Structure of the Printer Head

Figure 2:
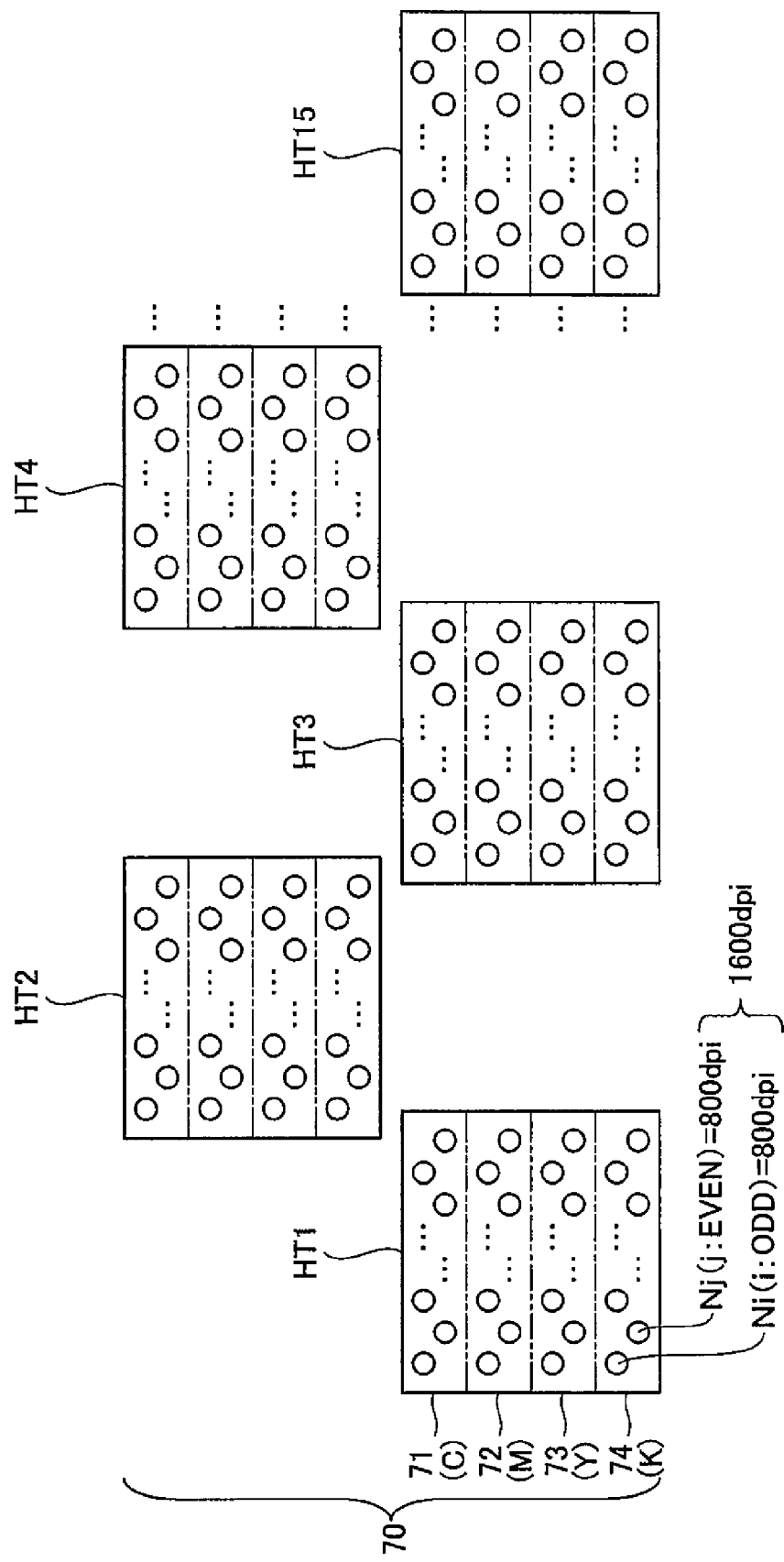
FIG. 2 is an explanatory diagram illustrating the detailed structure of a printer head 70.

FIG. 2 is an explanatory diagram illustrating the detailed structure of the printer head 70. As is shown in the figure, the printer head 70 in the present embodiment is structured with 15 sets of print head tips HT 1 through HT 15, lined up in a zigzag pattern, in which are formed nozzle arrays 71 through 74 that each spray inks of respective colors C, M, Y, and K. The length of a single print head tip is approximately 20 mm. A single ink that is sprayed from these head tips forms dots in a single raster through coordinating the timing of the paper feed and spraying of the ink. Note that the print head tips HT 1 through HT 15 in the present embodiment are formed in a zigzag pattern in consideration of issues of space for the placement of ancillary devices and issues of strength of the end of the print head tip, but may instead be formed in a straight line.

Additionally, in the nozzle arrays 71 through 74, the nozzles in each are formed arrayed in a zigzag pattern. The odd-numbered nozzles Ni (where i is odd) and the even-numbered nozzles Nj (where j is odd) are arrayed with a density of 800 dpi each. The inks that are sprayed from the odd-numbered nozzles Ni and the even-numbered nozzles Nj form dots on the same raster through coordinating the spraying with the paper feeding mechanism 80. Consequently, the nozzle arrays 71 to 74 each has a nozzle density totaling 1600 dpi.

Note that the printer 10 in the present embodiment uses a thermal-type inkjet-type printer, but is not limited thereto, and should be a line printer that performs printing of specific image data through forming dots on a single raster from a plurality of print heads. For example, the inkjet printer may be of a piezo type or some other ink spray method, or may be of a dot impact-type printer or a printer of another printing method.

A-3. Overview of the Image Printing Process

Figure 3:
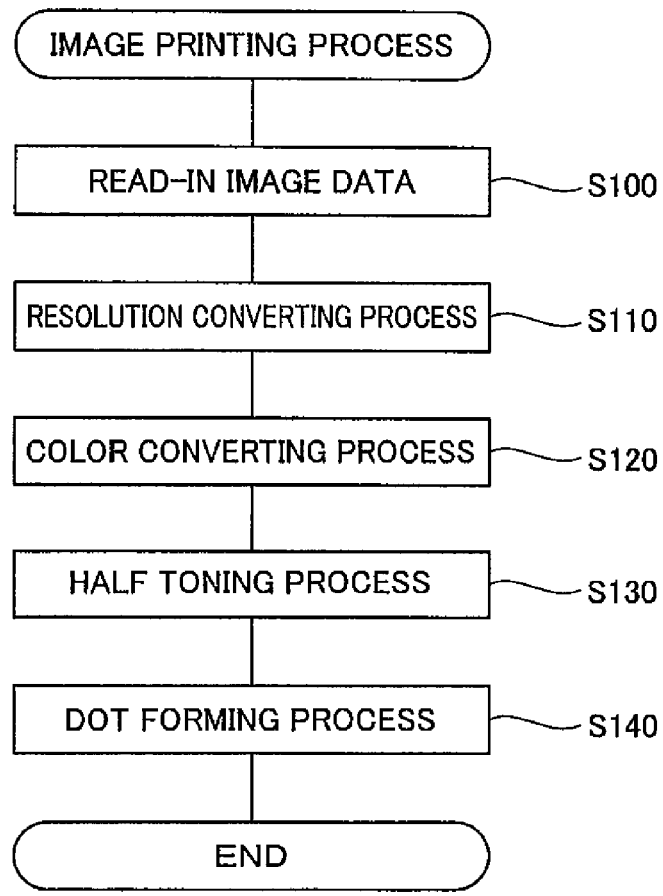
FIG. 3 is a flow chart illustrating the flow of the image printing process of the printer 10.

FIG. 3 is a flowchart illustrating the flow of processing for the printer 10 to print image data D by converting the image data read the into dot data that expresses whether or not a dot is to be formed, through applying specific image processing to the image data D that is stored in the memory card MC.

When the image printing process commences, the control unit 20 reads in the image data D to be printed from the memory card MC (Step S100). Here the image data will be explained as being RGB color image data, but the present invention is not limited to being colored image data, but instead can be applied similarly for monochrome image data as well.

When the image data D is read in, the control unit 20 performs a resolution converting process (Step S110). The resolution converting process is a process for converting the resolution of the image data that has been read in into the resolution (the printing resolution) at which the printer 10 will print the image. When the printing image resolution is higher than the resolution of the image data, then interpolation calculations are performed to increase the resolution through generating new image data between pixels. Conversely, if the image data resolution is higher than the printing resolution, then the resolution is degraded through thinning, with a specific ratio, the image data that has been read in. In the resolution converting process, the resolution of the image data D is converted to the printing resolution through performing this operation.

Once the resolution of the image data D is converted in this way to the printing resolution, then the control unit 20 performs a color converting process (Step S120). The color converting process converts RGB color image data, which is expressed through a combination of R, G, and B gradation values, into image data expressed by a combination of gradation values of the individual colors that are used for printing. As described above, the printer 10 uses four colors of ink, C, M, Y, and K, to print the images. Given this, in the color converting process in the present embodiment, a process is performed to convert the image data that is expressed by the RGB colors into data expressed by gradation values for each of the colors C, M, Y, and K.

When the gradation data for the individual C, M, Y, and K colors are obtained in this way, the control unit 20 performs a half toning process as the process of the half toning processing unit 31 (Step S130). This process generates dots at the appropriate density depending on the gradation value of the gradation data, and is a process to determine whether or not dots will be formed for each pixel, and a dithering method is used in the present embodiment. The dithering method is a method that determines whether or not dots will be formed for each individual pixel through comparing, for each individual pixel, a threshold value, established in a dithering mask, to the gradation value of the image data.

Figure 4:
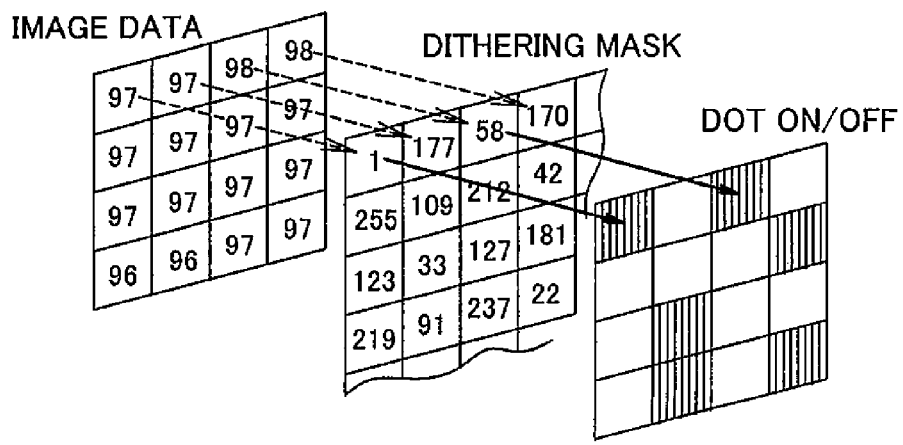
FIG. 4 is an explanatory diagram illustrating conceptually the state wherein a dithering mask is referenced to determine whether or not a dot is to be formed for each pixel.

The aforementioned dithering method will be described in detail using FIG. 4. FIG. 4 is an explanatory diagram illustrating conceptually the state wherein the dithering mask is referenced to determine whether or not a dot is to be formed for each individual pixel. When making the determinations as to whether or not dots are to be formed, first a pixel for which the decision is to be made is selected, and the gradation value of the image data for it that pixel is compared to a threshold value that is stored in a corresponding location in the dithering mask. The arrows indicated by the fine dotted lines in FIG. 4 illustrate schematically the comparisons of the gradation values of the image data to the threshold values that are stored in the dithering mask, for each individual pixel. For example, for the pixel that is at the upper left corner of the image data, the gradation value of the image data is 97, and the threshold value in the dithering mask is 1, and so it is determined that a dot is to be formed in this pixel. The arrows indicated by the solid lines in FIG. 4 illustrate schematically the state wherein, for these pixels, the determination is that dots are to be formed, where the determination results are written to memory.

On the other hand, for the pixels at the right edge of these pixels, the gradation value for the image data is 97 and the threshold value in the dithering mask is 177, and thus it is the gradation value that is higher, so that the decision is to not form dots for these pixels. In the dithering method the dithering mask is referenced in this way to determine whether or not dots are to be formed for each individual pixel, to thereby convert the image data into data indicating whether or not to form dots for each individual pixel.

Note that the dithering mask used in the aforementioned Step S130 is a dithering mask that is generated so as to control the degradation of the printing quality of the image data D, even when there is positional shift in the print head tips HT 1 through HT 15, and the details thereof will be described in Section A-4, "Method for Generating and Method for Using the Dithering mask."

Additionally, in the half toning process, after data indicating whether or not a dot is to be formed in each pixel is obtained from the gradation data for each color C, M, Y, and K, then the control unit 20 prints an image through forming dots on the printer paper according to this control data, as the process of the printing controlling unit 32 (Step S140). That is, the paper feeding motor 84 illustrated in FIG. 1 is driven, and, in coordination with this motion, ink droplets are sprayed from the printer head 70 based on the dot data. The result is that the image data D will be printed by performing ink dots of the appropriate colors at the appropriate locations.

A-4. Method for Generating and Method for Using the Dithering mask

In the printer 10 as set forth in the present embodiment, as described above, the printer head 70 is structured by arranging the print head tips HT 1 through HT 15. There may be cases wherein positional shift has occurred in these print head tips HT 1 through HT 15. Positional shift refers to the print head tips HT 1 through HT 15 being positioned in a state shifted from the proper position wherein they actually should be positioned, as a problem with manufacturing precision. For example, the print head 70 in the printer 10 has a nozzle pitch of 1600 dpi, and thus even if there is a minute shift of 16 µm of the position wherein any of the print head tips HT 1 through HT 15 is positioned relative to the neighboring print head tip, then there will have been a shaft of one dot in the printed image.

FIG. 5 will be used to explain this positional shift of the print head tips HT 1 through HT 15 in detail. In the figure, Pattern 0 illustrates the case wherein the print head tip HT 1 and the print head tip HT 2 are positioned properly, without the occurrence of positional shift. The print head tips HT 1 and HT 2 are disposed in a zigzag pattern, as described above, but for simplicity are positioned arrayed in a straight line in the center portion of the figure, to illustrate the positional relationship of the print head tips HT 1 and HT 2. In this way, in a state wherein no positional shift has occurred between the print head tips HT 1 and HT 2, the dots in the printed image, formed by ink that is sprayed from the print head tips HT 1 and HT 2, will be disposed in a straight line, formed on the same raster, as illustrated in the right-hand column of the figure. That is, there is no degradation of the printing quality.

On the other hand, Pattern 1 in the figure illustrates the case wherein the print head tip HT 2 has shifted up one pixel up from the proper location relative to the print head tip HT 1, as is shown in the center of the figure. In this case, as is shown in the right-hand column of the figure the raster that should be formed as a straight line is formed including the step difference in the junctions between the print head tips HT 1 and HT 2, or in other words, the image quality will be degraded.

Similarly, Pattern 2 shows the case wherein the print head tip HT 2 is positioned shifted one pixel down from the proper position relative to the print head tip HT 1, Pattern 3 shows the case wherein the print head tip HT 2 is positioned shifted one pixel to the right from the proper position relative to the print head tip HT 1, and Pattern 4 shows the case wherein the print head tip HT 2 is positioned shifted one pixel to the left from the proper position relative to the print head tip HT 1. In all of these cases, there is degradation to the printing quality at the junctions between the print head tips HT 1 and HT 2.

Such positional shifts of the print head tips HT 1 through HT 15 are not limited to a single direction such as up, down, left, or right, as shown in FIG. 5, and not limited to a single pixel distance, but may occur in any direction at any distance.

The printer 10 in the present embodiment can perform the half toning process of the aforementioned Step S130 using a dithering mask capable of reducing the degradation in the printed image quality, even when there is positional shift of this type in the print head tips HT 1 through HT 15. Such a dithering mask will be referred to as the "optimal dithering mask," below, and the method for generating this optimal dithering mask and the method for using the dithering mask that has been generated will be described.

Figure 6:
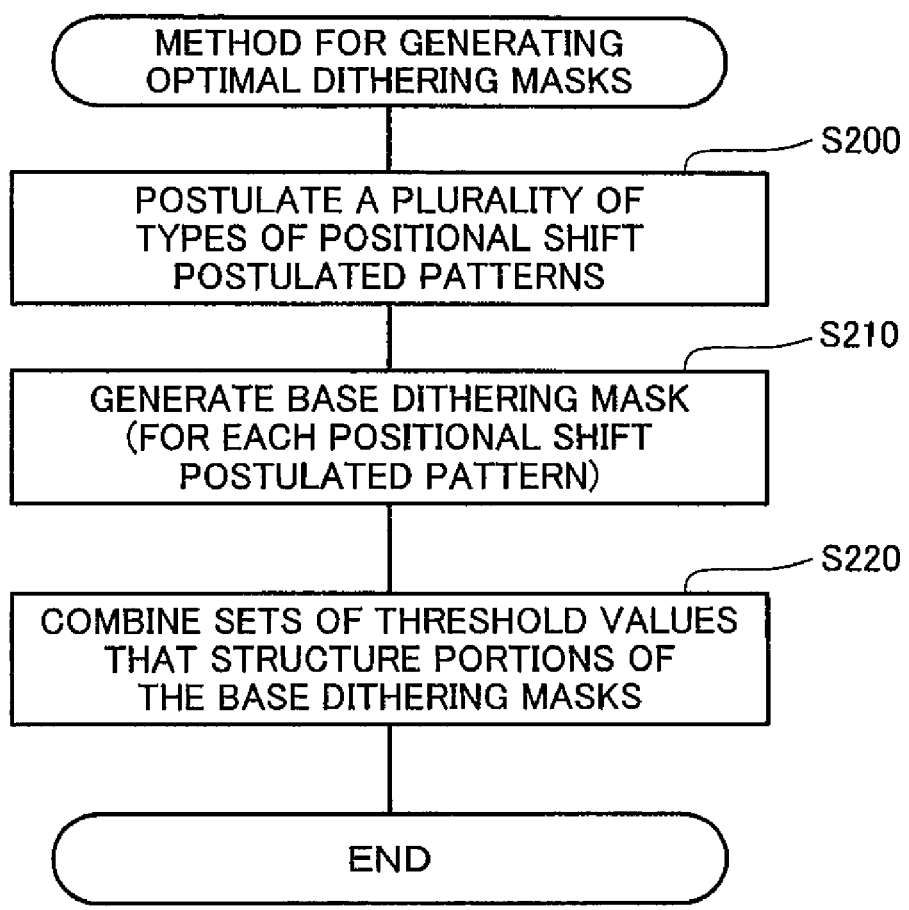
FIG. 6 is a flow chart illustrating the flow in the method for generating an optimal dithering mask for use in a half toning process.

FIG. 6 shows a flowchart illustrating the flow of the process for generating the optimal dithering mask used by the printer 10. When generating the optimal dithering mask, first a plurality of types of positional shift postulated patterns are postulated for the positional shifts of the print head tips HT 1 through HT 15 (Step S200). Patterns wherein positional shift has not occurred may be included in the positional shift postulated patterns. In the present embodiment, the five positional shift patterns illustrated in FIG. 5 are established as postulated patterns 0 through 4, respectively.

When positional shift postulated patterns have been postulated in this way, a base dithering mask BDi (wherein i is the postulated number for the positional shift postulated pattern, where, in the present embodiment, i=4) is generated for each of the postulated positional shift postulated patterns (Step S210). These base dithering masks BDi are dithering masks that are considered in order to obtain favorable dot dispersion characteristics, even when the postulated positional shift has occurred, and the method for creating these base dithering masks BDi will be described below.

The base dithering mask BD0, corresponding to the pattern 0, wherein no positional shift has occurred, can use any of a variety of known optimization methods. For example, in the method of the publicly known document Japanese Unexamined Patent Application Publication 2007-15359, illustrated in FIG. 16, the granularity index illustrated in FIG. 11 of Japanese Unexamined Patent Application Publication 2007-15359 may be used. The method in FIG. 16 of this publicly known document has the same flow as the method in FIG. 7 in the present application, described below. Moreover, the granularity index in FIG. 11 of this known document is an index that is calculated by taking the power spectrum FS of the Fourier transform of the image, weighting the power spectrum FS thus obtained according to the visual sensitivity characteristics VTF (visual transfer function) relative to the spatial frequencies of human vision, and then integrating over each of the spatial frequencies, and is expressed as Equation 1. The smaller the value of the granularity index, the better the granularity (the better the dot dispersion characteristics). Note that the RMS granularity, or the like, can be used instead of the granularity index, to use a different evaluation index for the dot dispersion characteristics.

$$\text{granularity index} = k \int FS(u)VTF(u)du \quad (1)$$

$$VTF(u) = 5.05\exp\left(\frac{-0.138\pi L u}{180}\right)\left\{1 - \exp\left(\frac{-0.1\pi L\ u}{180}\right)\right\}$$

$FS(u)$: power spectrum $K$: coefficient

The method of generating the base dithering masks BD1 through BD4 relative to the positional shift postulated patterns 1 through 4 wherein positional shift has occurred in the print head tips will be explained using FIG. 7, using, as the example, the base dithering mask BD1 for the case wherein the positional shift of Pattern 1 (that is, a positional shift of one pixel up) has occurred. In generating the base dithering mask BD1, first the original dithering mask is read in (Step S300). This original dithering mask can use, for example, the base dithering mask BD0 for the pattern wherein no positional shift has occurred, described above.

Figure 8:
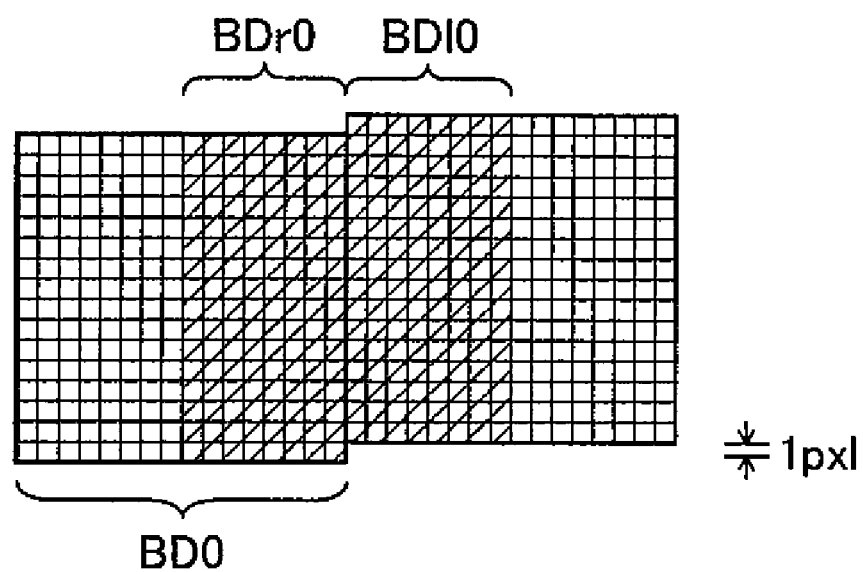
FIG. 8 is an explanatory diagram for a dithering mask unit in the optimization of the base dithering mask.

Next, dithering masks corresponding to each of the postulated positional shift patterns are set from this base dithering mask BD0 that has been read in. This process will be explained using the FIG. 8, using, as an example the case wherein the positional shift of Pattern 1, illustrated in FIG. 5, has occurred (that is, a positional shift of one pixel up). For Patterns 2 through 4, the method is identical to the case of Pattern 1, so explanations thereof will be omitted. FIG. 8 illustrates the state wherein the base dithering mask BD0, which has the same threshold value structure, is shifted one pixel upward, and provided contiguously on the side. The pixel positions corresponding to each other in each base dithering mask BD0 have identical threshold values. In this way, two dithering masks lined up in a row, depending on the positional shift that is postulated, are set as the dithering mask A (Step S302).

Note that while in FIG. 8, a dithering mask that is 16 pixels in the horizontal direction and 16 pixels in the vertical direction is shown for simplicity, the size of the dithering mask may be set as appropriate, in consideration of efficiency of the half toning process, or the like, wherein the dithering mask is used, or in consideration of the efficiency of generating the dithering mask, to, for example, 256 pixels in the horizontal direction and 256 pixels in the vertical direction, or 256 pixels in the horizontal direction and 128 pixels in the vertical direction, or the like.

Additionally, two pixel locations (the pixel location p and the pixel location q) are selected at random from the dithering mask A from the threshold value set BDr0 or BDl0, which each have widths that are half as wide as the base dithering mask BD0 (Step S304), and the threshold value that is set at the selected pixel position p is replaced by the threshold value that is set at the selected pixel position q, and the dithering mask that is thus obtained is set as the dithering mask B (Step S306).

The granularity evaluation value EVa is calculated next for the dithering mask A (Step S308). Here the granularity evaluation value EVa is an evaluation value calculated as described below. Using the dithering mask A to apply the dithering method to an image with 256 different gradation values, from 0 to 255, produces 256 different images that are expressed by whether or not a dot is formed. After performing the granularity index, as described above, for the 256 images thus obtained, the average value is then calculated, and the value thus obtained is used as the granularity evaluation value. Note that when calculating the granularity evaluation value, weighting factors may be applied to specific gradation values (for example, low gradation values wherein the dots are particularly noticeable) to perform the averaging, rather than simply taking the arithmetic mean of the 256 granularity indexes.

After obtaining the granularity evaluation value EVa for the dithering mask A in this way, the same is also done for the dithering mask B to calculate the granularity evaluation value EVb (Step S310). Following this, the granularity evaluation value EVa of the dithering mask A and the granulation evaluation value EVb of the dithering mask B are compared (Step S312). At this time, if it is determined that the granularity evaluation value EVb is the smaller one (Step S312: YES), then the dithering mask B, wherein the threshold values set in the two pixel locations were switched, can be considered to be superior in terms of the printing dot dispersion characteristics. Given this, in this case the dithering mask B replaces the dithering mask A (Step S314). On the other hand, if the granularity evaluation value EVb of the dithering mask B is determined to be larger than the granularity evaluation value EVa of the dithering mask A (Step S312: NO), then the dithering mask is not replaced.

In this way, it is only when the granularity evaluation value EVb of the dithering mask B is determined to be smaller than the granularity evaluation value EVa of the dithering mask A and an operation has been performed to replace the dithering mask B for the dithering mask A that a determination is made as to whether or not the granularity evaluation value has converged (Step S316). That is, because the original dithering mask used that which was optimized to the state wherein there was no positional shift, a large value will be obtained for the granularity evaluation value immediately after commencing the operations such as described above. However, if a smaller granularity evaluation value is obtained through switching the threshold values that have been set in two different pixel locations, then the dithering mask wherein the threshold values have been replaced is used, and if the operation described above is then repeated on this dithering mask, then the granularity evaluation values obtained will become smaller, and eventually can be expected to stabilize at some value. In Step S316, a determination is made as to whether or not the overall granularity evaluation value has stabilized, or in other words, whether or not the granularity evaluation value can be considered to have stopped decreasing. When it comes to whether or not the granularity evaluation value has converged, it can be determined that the granularity evaluation value has converged if, for example, when the granularity evaluation value EVb of the dithering mask B is smaller than the granularity evaluation value EVa of the dithering mask A, the amount of reduction of the granularity evaluation value is calculated, and this amount of reduction is stabilized below a constant value over multiple iterations.

If it is determined that the granularity evaluation value has not converged (Step S316: NO), then processing returns to the aforementioned Step S304, and the series of operations is repeated after selecting two new pixel positions are selected. While iterating these operations in this way, eventually the granularity evaluation value will converge, and when it has been determined that the granularity evaluation value has converged (Step S316: YES), then the set of threshold values that is half as wide as the dithering mask A at this time is used as the base dithering mask BD1 (Step S318). Note that of the base dithering mask BD1 obtained in this way, the set of threshold values positioned corresponding to the original set of threshold values BDr0 is called the set of threshold values BDr1, and a set of threshold values positioned corresponding to the original set of threshold values BDl0 is called the set of threshold values BDl1.

However, in this method the granularity evaluation value may converge to a local optimal prior to achieving a value that is adequately small. The method known as simulated annealing may be used in order to avoid this. Specifically, a noise nz of an appropriate amplitude, which changes each time, may be applied to the granularity evaluation value EVa in the aforementioned Step S312, for example, before making the comparison. That is, the determination is made as to whether or not EVa+nz>EVb. If the comparison is performed in this way after adding the noise nz, then the dithering masks will be switched if the result of adding the noise nz to the granularity evaluation value EVa is larger than the granularity evaluation value EVb, even when the granularity evaluation value EVb is larger than the granularity evaluation value EVa (that is, even when the printing dot dispersion characteristics of the dithering mask A are superior to those of the dithering mask B).

Even though the granularity evaluation value becomes larger (that is, the printing dot dispersion characteristics are worsened) temporarily when the dithering mask is replaced in this way, if the amplitude of the noise nz is gradually decreased and iterations are performed an adequate number of times (the aforementioned Step S316: NO process), and ultimately the noise nz is decreased to zero, then even though the number of iterations before convergence will be increased, there will be no falling into any local optimum. As a result, it is possible for the granularity evaluation value to converge at a lower value.

At this point we will return the explanation to FIG. 6. When base dithering masks BD0 through BD4 (sets of threshold values BDr0 through BDr4 and BDl0 through BDl4) are obtained in this way for the postulated positional shift postulated patterns 0 through 4, then the sets of threshold values BDr0 through BDr4 and BDl0 through BDl4, which are portions of the base dithering masks BD0 through BD4, are combined to produce the optimal dithering masks (Step S220). This process is performed through selecting and combining one set of threshold values each from the sets of threshold values BDl0 through BDl4, which constitute the left sides of the base dithering masks, and from threshold values BDr0 through BDr4, which constitute the right sides of the base dithering masks. For example, when using the set of threshold values BDl0 as the set of threshold values on the left side, then there are five possible combinations with the sets of threshold values on the right side, those being BDr0 through BDr4. Similarly, there are five different types of combinations that are possible when using the sets of threshold values BDl0 through BDl4 for the sets of threshold values on the left side, so in all, it is possible to produce 25 different types of optimal dithering masks.

The method for using the optimal dithering masks produced in this way will be explained. An example of the aforementioned dithering mask pattern table 52 that is generated using the base dithering masks BD0 through BD4 is illustrated in FIG. 9. The dithering mask pattern table 52 contains the position shift postulated patterns 0 through 4 for which the position shifts of the print head tips HT 1 through HT 15 were postulated in advance, and also the base dithering masks BD0 through BD4, stored corresponding thereto. Note that in the figure, for ease in comprehension, an identical dithering mask is lined up twice for the base dithering masks BD0 through BD4, but in practice it is a single dithering mask.

Figure 10A:
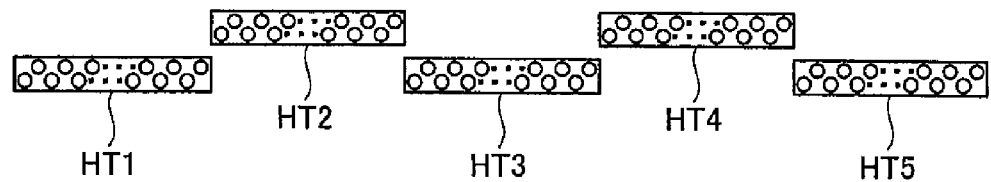
FIG. 10A through FIG. 10C are explanatory diagrams illustrating an example of application of a dithering mask.
Figure 10B:
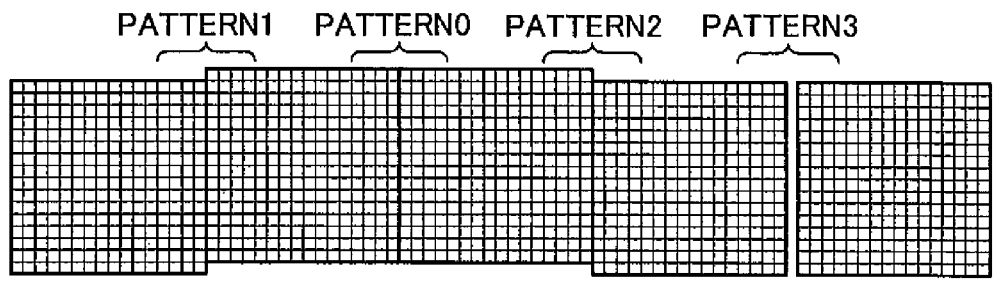

The control unit 20 of the printer 10 is that which performs the half toning process using the optimal dithering masks generated referencing the dithering mask pattern table 52 in the aforementioned Step S130, and the details of the process will be explained using FIG. 10A through FIG. 10C. FIG. 10A illustrates the state wherein the print head tips HT 1 through HT 5 are lined up. In contrast, FIG. 10B illustrates a positional shift between the print head tips HT 1 through HT 5. As is illustrated, there is a positional shift following Pattern 1 illustrated in FIG. 5 between the print head tip HT 1 and the print head tip HT 2. Similarly, there is a Pattern 0 shift (that is, no positional shift) between the print head tip HT 2 and the print head tip HT 3, a Pattern 2 positional shift between the print head tip HT 3 and the print head tip HT 4, and a Pattern 3 positional shift between the print head tip HT 4 and the print head tip HT 5. Note that these types of positional shifts can be discerned through measuring the nozzle pitches in the factory at the time of production, or printing a test pattern after production and measuring the printer dots therein, and can be stored in a rewritable EEPROM that may be provided in the printer 10.

Figure 10C:
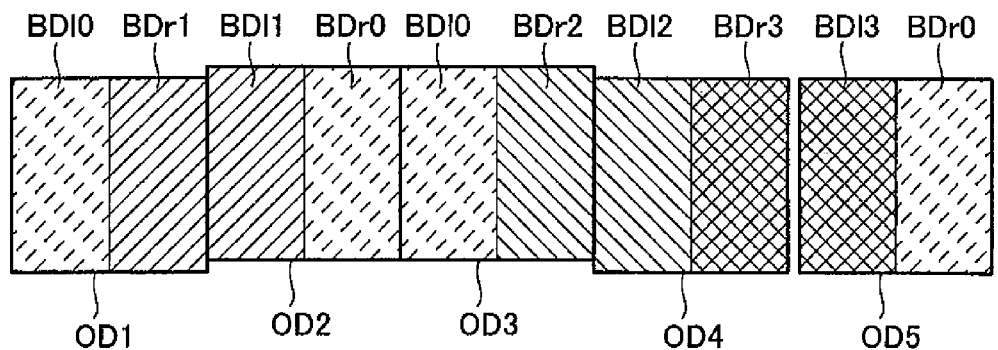

FIG. 10C illustrates an optimal dithering mask that is applied to each of the pixel positions in consideration of the positional shift patterns described above. For ease of understanding, in this example the sizes of the dithering masks all have widths that are identical to those of sets of pixels that are formed by uniform print head tips, but instead the widths of the dithering masks may be multiples of 1/M (where M is a nonzero positive integer) of the pitch of the print head tips HT 1 through HT 5. Using such a structure is efficient because it can apply the dithering masks so as to always apply specific locations of the dithering masks so as to correspond to the junction portions between the print head tips HT 1 to HT 15.

In the half toning process of the aforementioned Step S130, the control unit 20 first references the positional shift information that is stored in the EEPROM for the pixel region for which the half toning process is to be performed. After this, it references the dithering mask pattern table 52 to generate the optimal dithering mask by combining the sets of threshold values that structure the base dithering masks corresponding to the positional shift information.

For example, as shown in the figure, for the pixels corresponding to the print head tip HT 1, the control unit 20 generates an optimal dithering mask OD 1 by referencing the dithering mask pattern table 52 and combining the set of threshold values BDl0 that structure the left side of the base dithering mask BD0 that corresponds to the Pattern 0 wherein there is no positional shift, and the set of threshold values BDr1 that structures the right side of the base dithering mask BD1 that corresponds to the Pattern 1 positional shift, and uses the result to perform the half toning process, because there is no positional shift on the left side of the print head tip HT 1, and there is Pattern 1 positional shift on the right side of the print head tip HT 1.

Similarly, for the pixels corresponding to the print head tip HT 2, the control unit 20 performs the half toning process by generating and applying an optimal dithering mask OD 2 that combines the set of threshold values BDl1 that structure the left side of the base dithering mask BD1 that corresponds to the Pattern 1 positional shift, and the set of threshold values BDr0 that structures the right side of the base dithering mask BD0 that corresponds to Pattern 0 wherein there is no positional shift, because there is Pattern 1 positional shift on the left side of the print head tip HT 2, and no positional shift on the right side of the print head tip HT 2. Because the process is identical for the optimal dithering masks OD 3 through OD 5 in the figure, detailed explanations thereof will be omitted. In this way, the control unit 20 performs the half toning process using optimal dithering masks that are generated taking into account the structural positioning of the sets of threshold values that structure the applicable optimal dithering masks, and the patterns of shifts on both sides of the pixel position to which the optimal dithering mask will be applied.

Note that in the present embodiment, the positional shift information is stored in a rewritable EEPROM, and that information is referenced along with the dithering mask pattern table 52 to perform the half toning process after producing the optimal dithering mask; however, the correspondence between pixel positions and the optimal dithering mask to be applied to those pixel positions may be stored in advance in the dithering mask pattern table 52, and the structure may be such that the half toning process is performed through referencing only the dithering mask pattern table 52. Structuring as in the present embodiment is because this enables handling of changes in the status of the positional shift through overwriting the positional shift information that is stored in the EEPROM when there has been a change in the status of the positional shift for some reason after the printer 10 has been shipped.

Moreover, in the present embodiment, the control unit 20 references the dithering mask pattern table 52 to generate the optimal dithering mask from the base dithering masks BD0 through BD4 (the sets of threshold values BDr0 through BDr4 and BDl0 through BDl4), to be used in the half toning process; however, the optimal dithering mask may be stored in the dithering mask pattern table 52 in advance. That is, the positional shift patterns on both sides of the pixel positions to which the optimal dithering masks are to be applied, and the 25 types of optimal dithering masks corresponding thereto, can be stored in the dithering mask pattern table 52 in advance, and the control unit 20 may select, from the dithering mask pattern table 52, the optimal dithering masks depending on the positional shifts at each pixel position.

Furthermore, in the present embodiment, a case is illustrated wherein the width of the optimal dithering mask is equivalent to the pitch of the print head tips HT 1 through HT 15; however, if the width of the optimal dithering mask were half of the pitch of the print head tips HT 1 through HT 15, then the optimal dithering mask to be applied to the center portions of each of the print head tips HT 1 to HT 15 could be generated by combining the threshold value sets BDr0 and BDl0 that correspond to the postulated Pattern 0 wherein there is no positional shift.

Furthermore, in the present embodiment, patterns were postulated, as the aforementioned positional shift postulated patterns, wherein the positional shift of the print head tip was either a pattern with no positional shift, or with a shift by one pixel up, down, left, or right; however, the amount of the positional shift may be postulated as any amount, such as 0.3 pixels, 0.5 pixels, 1.5 pixels, etc. Moreover, the positional shift is not limited to the independent directions of up, down, left, and right, but positional shift postulated patterns may also postulate combinations of up, down, left, and right, such as a positional shift of 0.5 pixels up and 0.3 pixels to the left. In such a case, it is possible to respond to the various types of positional shifts.

Note that, as described above, when the amount of the positional shift is postulated as being a non-integer value, then the number of pixels in the image data D may be increased virtually so that the image shift amount will be an integer when producing the base dithering mask. For example, when postulating a positional shift of 0.5 pixels up and 0.5 pixels to the right, then one pixel of the image data D can be handled, virtually, as comprising a total of four pixels, that is, two pixels in the vertical direction by two pixels in the horizontal direction, having identical gradation values. In accordance with this, one threshold value of the dithering mask is handled as being structured, virtually, from four identical threshold values. At this point, the basic dithering mask BD should be generated postulating, virtually, a positional shift of a one pixel shift upward and a one pixel shift to the right.

This method of producing the optimal dithering mask produces the optimal dithering mask by combining sets of threshold values BDr0 through BDr4 and BDl0 through BDl4 that were generated so as to produce favorable dot dispersion characteristics relative to the postulated positional shift patterns 0 through 4, and so it is possible to suppress degradation in the printed image quality even when there is positional shift in the print head tips HT 1 to HT 15 by being able to maintain the printed dot dispersion characteristics through performing a half toning process using an optimal dithering mask that is a combination that corresponds to the positional shift.

Describing the effects differently, there is the property of creating excellent dot dispersion characteristics in the printed materials, comparable to the case of using a printer without positional shift, through the use of this optimal dithering mask in a half toning process in a printer that has print head tips wherein there is a postulated positional shift.

B. Modifications

Modifications of the present invention will be explained.
B-1. Modification 1

As is shown in FIG. 8, in the present embodiment, two pixel positions (pixel position p and pixel position q) were selected at random from the set of threshold values BDr0 or BDl0 having a width that is half that of the base dithering mask BD0, of the dithering mask A, and the threshold values that are set in the pixel positions p and q were switched and the granularity evaluation values were calculated to generate base dithering masks BDi for each postulated positional shift postulated pattern. (See FIG. 7.) That is, for each postulated positional shift postulated pattern, optimization is performed for the postulated positional shift over the entire range of the sets of threshold values that structure the mask A. In contrast, the point of difference from the embodiment is that, in the first modification, optimization is performed for each postulated positional shift postulated pattern for only a portion of the set of threshold values that structure the mask A, where the set of remaining non-optimized threshold values is used as a set of threshold values that are shared by each of the postulated positional shift postulated patterns. This point of difference will be explained in detail below.

Figure 11:
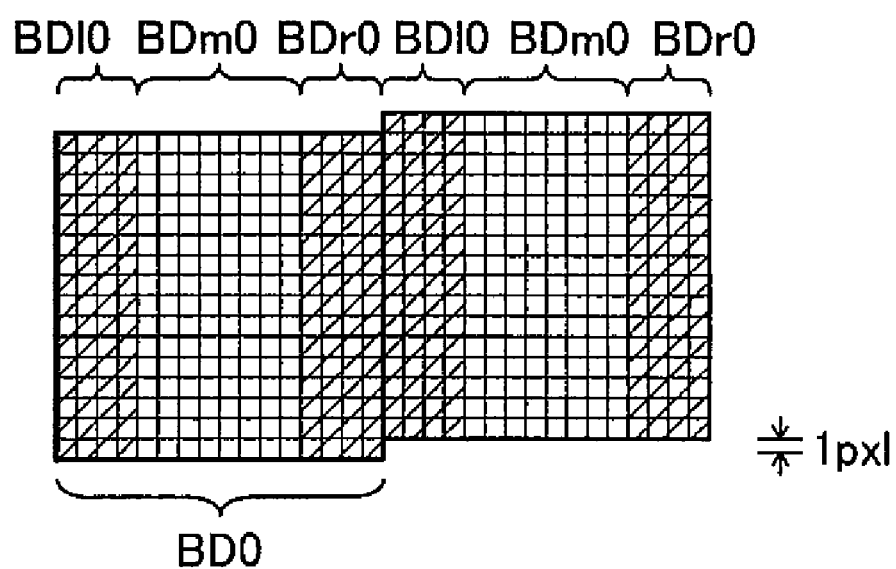
FIG. 11 is an explanatory diagram of a dithering mask unit in the optimization of a base dithering mask as a first modification

In the first modification, the dithering mask A illustrated in FIG. 11 is used instead of the dithering mask A illustrated in FIG. 8. The dithering mask A illustrated in FIG. 11, as is illustrated, comprises the sets of threshold values of BDr0 and BDl0 that structure both side parts of the base dithering mask BD0, and the set of shared threshold values BDm0 that are disposed in the middle. In this type of dithering mask A, two pixel positions (pixel position p and pixel position q) are selected at random from the set of threshold values BDr0 or BDl0, and the threshold values established in the selected pixel position p replaces the threshold value in the selected pixel position q, and the dithering mask thus obtained is used as a dithering mask B (corresponding to Step S304 and Step S306 in the embodiment). After this, as with the embodiment, the granularity evaluation values of the dithering mask A and the dithering mask B are calculated iteratively to optimize the portions corresponding to the sets of threshold values BDr0 and BDl0, to generate the base dithering masks BDi (corresponding to Step S308 through Step S318 in the embodiment).

In this way, the base dithering masks BD0 through BD4 that are generated for the respective position shift postulated patterns 1 through 4 structure the sets of threshold values such as illustrated in FIG. 12. That is, in the process of generating the base dithering masks BD1 through BD4, the sets of threshold values that are position corresponding to the set of shared threshold values BDm0, of the set of threshold values in the original base dithering mask BD0, has no change whatsoever in the threshold values, and maintains the identical threshold value structure even in the base dithering masks BD1 through BD4. In other words, the set of shared threshold values of BDm0 is a set of threshold values that is used in common in the base dithering masks BD0 through BD4, where the sets of threshold values BDr0 through BDr4 and BDl0 through BDl4 are sets of threshold values that are used individually in the base dithering masks BD0 through BD4.

Note that the widths of the sets of threshold values BDr0 through BDr4 and BDl0 through BDl4 may be set as appropriate in consideration of the degrees of freedom for selecting threshold values that structure the dithering masks and in consideration of the effects on human visual perception characteristics.

Figure 13A:
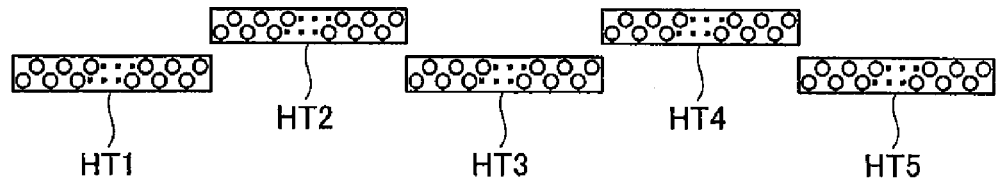
FIG. 13A through FIG. 13C are explanatory diagrams illustrating an example of application of a dithering mask as a first modification.
Figure 13B:
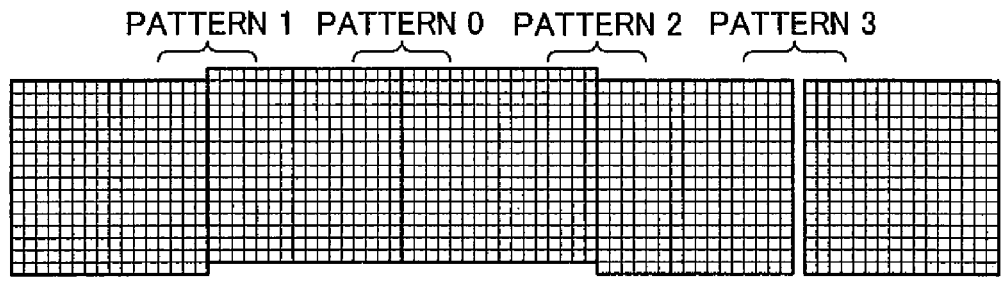

The method for performing the half toning process using the optimal dithering masks generated based on the base dithering masks BD0 through BD4, generated in this way, will be explained using FIG. 13A through FIG. 13C. FIG. 13A and FIG. 13B illustrate the state wherein the respective print head tips HT 1 to HT 5 are lined up, and the positions between the print head tips HT 1 to HT 5. These structures are identical to those of FIG. 10A through FIG. 10C, described above.

Figure 13C:
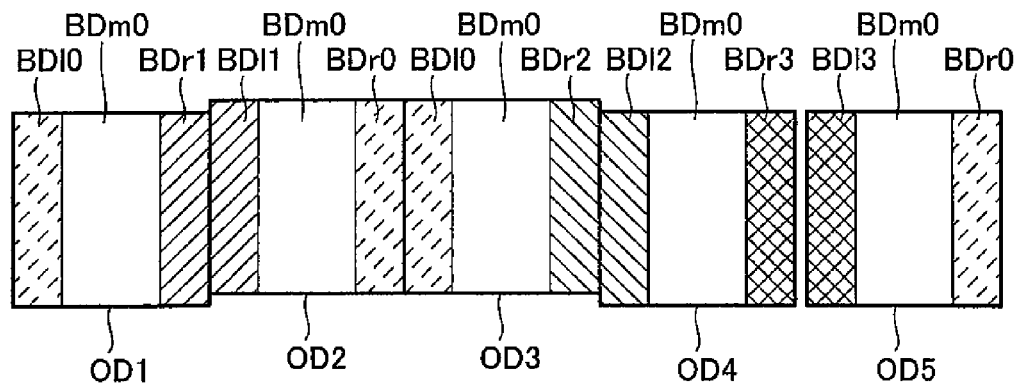

FIG. 13C illustrates the optimal dithering masks that are applied to the various pixel positions in consideration of the position shift patterns in the print head tips HT 1 through HT 5. In this modification, the size of the dithering masks has the same width as the set of pixels that are formed from the uniform print head tips. As is shown in the figure, for the pixels corresponding to the print head tip HT 1, the control unit 20 performs the half toning process by generating and applying an optimal dithering mask OD by referencing the dithering mask pattern table 52 illustrated in FIG. 12 and combining the set of threshold values BDl0 that structures the left side of the base dithering mask BD0 corresponding to the Pattern 0 wherein there is no positional shift, the set of shared threshold values BDm0, and the set of threshold values BDr1 that structure the right side of the base dithering mask BD1 corresponding to a positional shift of Pattern 1 because there is no positional shift on the left side of the print head tip HT 1, and there is a positional shift of Pattern 1 on the right side of the print head tip HT 1.

Similarly, for the pixels corresponding to the print head tip HT 2, the half toning process is performed by generating and applying an optimal dithering mask OD 2 that combines the set of threshold values BDl1 that structure the left side of the base dithering mask BD1 that corresponds to the Pattern 1 positional shift, a set of shared threshold values BDm0, and the set of threshold values BDr0 that structures the right side of the base dithering mask BD0 that corresponds to Pattern 0 wherein there is no positional shift, because there is Pattern 1 positional shift on the left side of the print head tip HT 2, and no positional shift on the right side of the print head tip HT 2. Because the process is identical for the optimal dithering masks OD 3 through OD 5 in the figure, detailed explanations thereof will be omitted. In this way, the set of shared threshold values BDm0 is used as a set of threshold values corresponding to the center portions of the print head tips wherein the positional shifts of the print head tips HT 1 to HT 5 are irrelevant.

Note that in the present embodiment as well, the structure is such that the set of shared threshold values BDm0 structures the middle portion of the optimal dithering mask, but the structure may instead be a structure wherein the set of shared threshold values BDm0 structure both end portions of the optimal dithering mask depending on the positional relationships between the print head tips and the optimal dithering masks that are applied.

If, as described above, the base dithering masks BD0 through BD4 are generated having the set of shared threshold values BDm0, then, when compared to the embodiment, the scope of optimization of the threshold values will be reduced by the amount of the set of shared threshold values BDm0, or in other words, the calculation overhead for optimization will be reduced. Consequently, it is possible to generate the base dithering masks BD0 through BD4 efficiently, and to generate the optimal dithering masks based thereon. Furthermore, because the half toning process is performed so as to apply the set of shared threshold values BDm0 to the pixels that are not affected by positional shifts in the print head tips HT 1 through HT 5, through the use of the set of shared threshold values BDm0 for a portion of the set of threshold values of the base dithering mask BD0 that is optimized for the Pattern 0 wherein there is no positional shift, it is possible to maintain excellent dot dispersion characteristics even in the printing regions corresponding to the set of shared threshold values BDm0.

B-2. Modification 2:

While in the first modification, a set of shared threshold values BDm0 that was used in common by the base dithering masks BD0 through BD4, and sets of threshold values BDr0 through BDr4 and BDl0 through BDl4, which are optimized relative to the positional shifts and which are used individually in the base dithering masks BD0 through BD4, were combined to generate the optimal dithering masks in order to generate the optimal dithering masks efficiently, the set of shared threshold values BDm0 may further be optimized in generating the optimal dithering masks.

Figure 7:
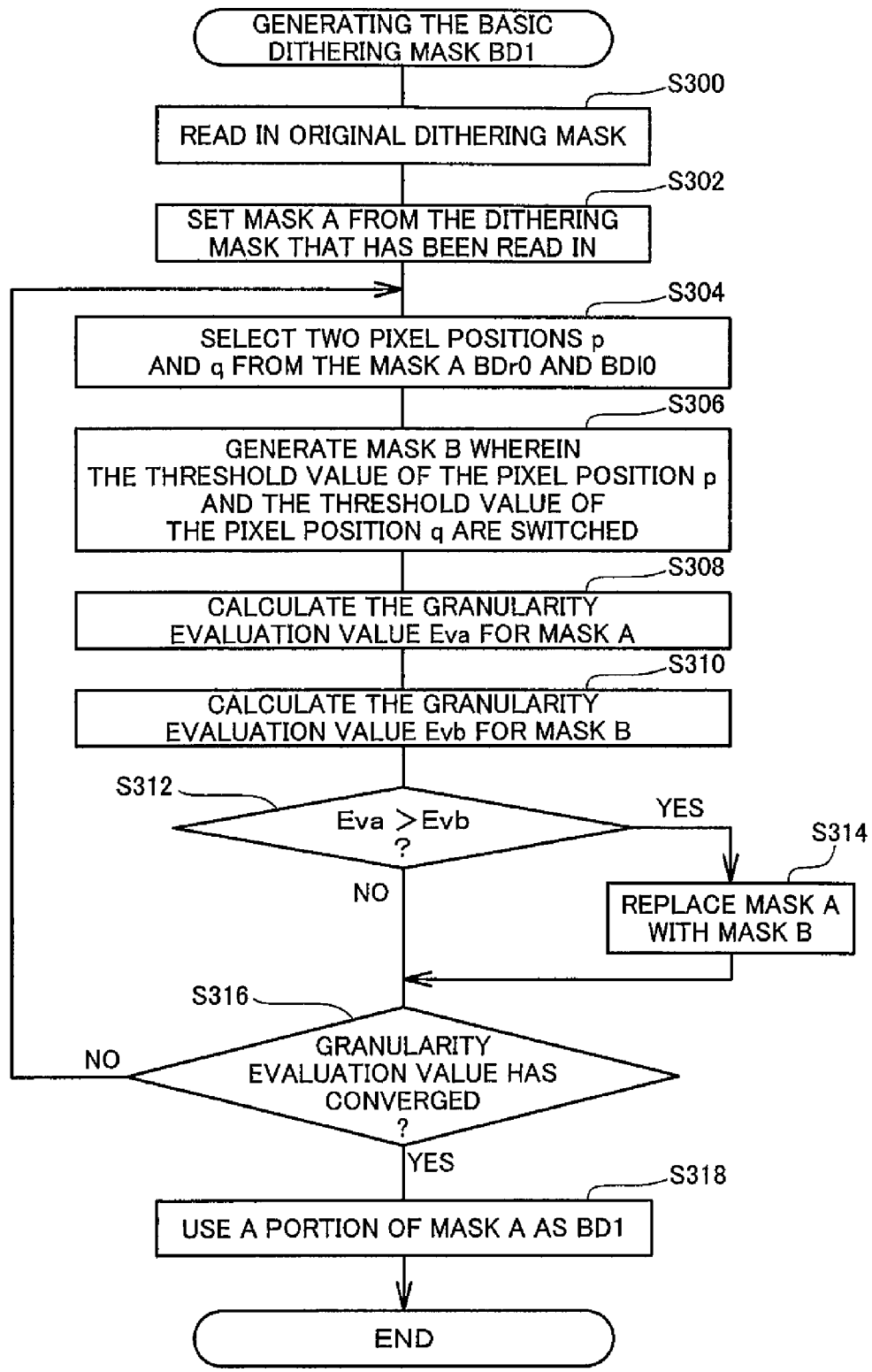
FIG. 7 is a flowchart illustrating the flow in the method for generating a base dithering mask that is a basis for the optimal dithering mask.

In this case, the optimization of the set of shared threshold values BDm0 may use the method illustrated in FIG. 7. For example, the optimal dithering masks comprising the sets of threshold values BDr1 and BDl2 and the set of shared threshold values BDm0 may be set as the mask A in Step S302 in FIG. 7, where the two pixel positions (the pixel position r and the pixel position s) may be selected at random from the portion of the set of shared threshold values BDm0, and the threshold values that are set for these pixel positions r and s can be exchanged and the granulation evaluation values can be calculated. By iterating this process, a new optimal dithering mask can be generated by combining the sets of threshold values BDr1 and BDl2, which have already been optimized, with the set of shared threshold values BDm0 when the granulation evaluation value has converged.

This method of generating the optimal dithering mask optimizes the set of shared threshold values BDm0 when combined with the sets of threshold values that are disposed on the sides thereof, and thus can further improve the dot dispersion characteristics of the dithering masks as a whole.

Although, in the above, an explanation was given for an embodiment as set forth in the present invention, the present invention is not limited to this embodiment, but rather, of course, may be embodied in a variety of forms without departing from the scope or spirit of the present invention. Moreover, the present invention may be embodied not only in a method of generating a dithering mask, but also in the form of the dithering mask.

What is claimed is:

1. A line printer comprising:

a plurality of print heads disposed in a line across a printing range;

a half toning unit that performs a half toning process, using a dithering mask, on image data; and a printing controlling unit that drives said print heads using results of the half toning process to form an image, wherein:

said dithering mask has a pattern generated by:

postulating a plurality of types of positional shift patterns each of which represents a shifted or a non-shifted state in specific directions and distances between said plurality of print heads;

generating a plurality of base dithering masks, each of which corresponds to each of the plurality of types of positional shift patterns in a one-to-one relation, by considering dot dispersion characteristics that occur in each of the plurality of types of positional shift patterns; and combining a plurality of threshold value sets each of which structures not all but part of one of the plurality of base dithering masks and is included in a different base dithering mask.

2. A line printer according to claim 1, wherein:

each of the plurality of base dithering masks comprises:

a set of shared threshold values that constitutes a partial area of the base dithering mask and is in common to each of the plurality of base dithering masks; and a set of individual threshold values that constitutes another partial area of the base dithering mask and is different between each of the plurality of base dithering masks; wherein:

the dithering mask is produced through combining the set of shared threshold values and the set of individual threshold values.

3. A line printer according to claim 2, wherein:

the set of shared threshold values structures a partial area of a base dithering mask that is generated by considering dot dispersion characteristics that occur in a positional shift pattern that represents the non-shifted state between the plurality of print heads.

4. A line printer comprising:
a plurality of print heads disposed in a line across a printing range;
a halftoning unit that performs a halftoning process, using a dithering mask, on image data; and
a printing controlling unit that drives said print heads using results of the half toning process to form an image, wherein:
said dithering mask is generated by:
postulating a plurality of types of positional shift patterns each of which represents a shifted or a non-shifted state in specific directions and distances between said plurality of print heads;
generating a plurality of base dithering masks, each of which corresponds to each of the plurality of types of positional shift patterns in a one-to-one relation, by considering dot dispersion characteristics that occur in each of the plurality of types of positional shift patterns, wherein each of the base dithering masks comprises: a set of shared threshold values that constitutes a partial area of the base dithering mask and is in common to each of the plurality of base dithering masks; and a set of individual threshold values that constitutes another partial area of the base dithering mask and is different between each of the plurality of base dithering masks:
generating a composite dithering mask that is composited by combining a the set of shared threshold values and the set of individual threshold values; and
correcting the set of shared threshold values by taking into account the dot dispersion characteristics of pixels corresponding to the set of shared threshold values that structures the composite dithering mask.

* * * * *